United States Patent [19]
Jordan

[11] Patent Number: 5,150,403
[45] Date of Patent: Sep. 22, 1992

[54] COIN FRAUD PREVENTION SYSTEM FOR COIN TELEPHONES

[76] Inventor: H. Weaver Jordan, 2189 NW. 53rd St., Fort Lauderdale, Fla. 33309

[21] Appl. No.: 706,370

[22] Filed: May 28, 1991

[51] Int. Cl.[5] .................. H04M 1/66; H04M 17/02
[52] U.S. Cl. .................................. 379/145; 379/146; 379/155
[58] Field of Search .................. 379/145, 146, 155

[56] References Cited

U.S. PATENT DOCUMENTS 4,674,114  6/1987  Crouch et al. .................. 379/146 X
5,022,073  6/1991  Jordan .................................. 379/145

Primary Examiner—Stafford D. Schreyer
Attorney, Agent, or Firm—Oltman and Flynn

[57] ABSTRACT

A coin fraud prevention system which includes a coin telephone having a voice transmitter, comprising a coin tone sensing arrangement for sensing coin tones, coupled to the voice transmitter of the telephone; and a coin telephone disabling arrangement in the coin telephone coupled to an output of the coin tone sensing arrangement for disabling the coin telephone in response to sensing of the coin tones from the transmitter; wherein further the coin tones include at least one or two coin tone frequencies, and the system has a bandpass filter having at least one pass band corresponding to the tone frequencies, and a tone detector coupled to the bandpass filter for generating a coin telephone disabling signal in response to receipt of the tone frequencies, wherein the disabling signal is connected to the coin telephone disabling arrangement, so as to prevent dialing of the call.

14 Claims, 7 Drawing Sheets

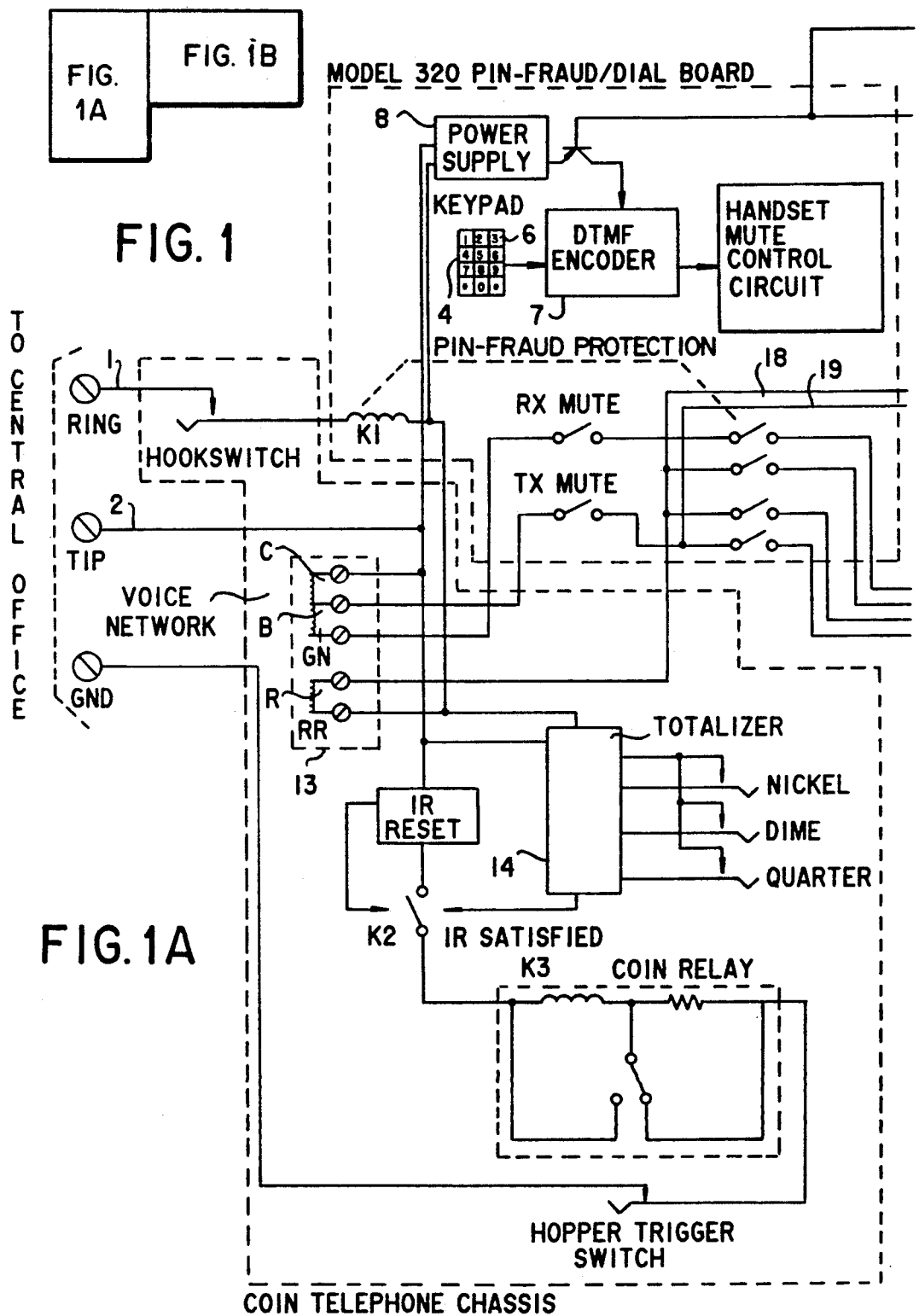

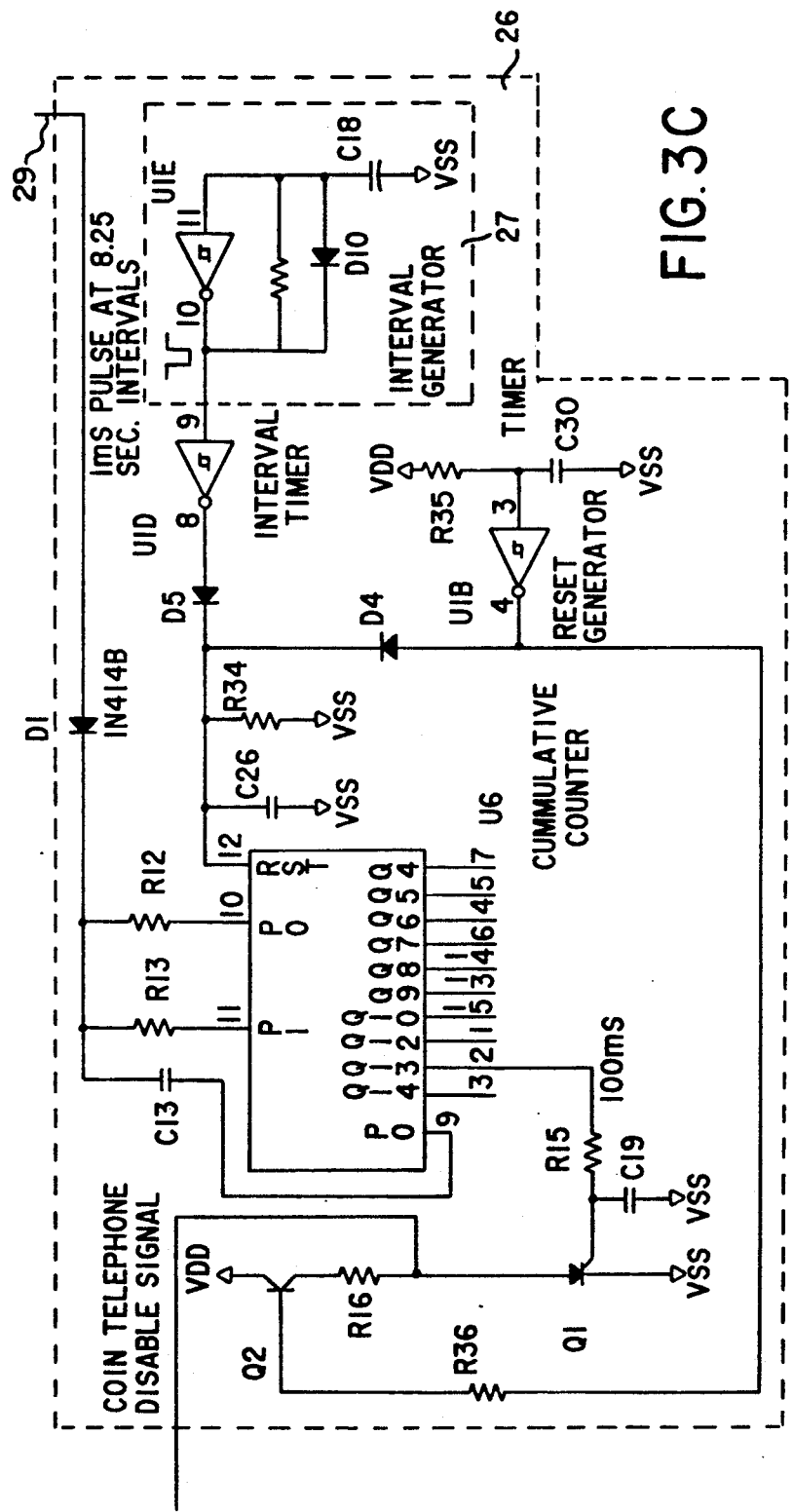

COIN FRAUD PREVENTION SYSTEM FOR COIN TELEPHONES

The invention relates to a coin fraud prevention system for coin telephones, and more particularly to a coin fraud prevention system with fraud reporting features.

BACKGROUND AND PRIOR ART

A form of pay telephone fraud which has become widespread, is performed by the perpetrator of the fraud using a small tone generator which generates tones emulating the tones used by telephone companies to signal the deposit of coins in the telephone.

These fraudulently generated tones are usually entered via the transmitter of the coin telephone.

No effective prior art for protecting against this form of fraud is known to applicant.

SUMMARY OF THE INVENTION

In accordance with the invention there is provided a coin fraud prevention system which includes a coin telephone having a voice transmitter, comprising a coin tone sensing arrangement for sensing coin tones, coupled to the voice transmitter of the telephone; and a coin telephone disabling arrangement in the coin telephone coupled to an output of the coin tone sensing arrangement for disabling the coin telephone in response to sensing of the coin tones from the transmitter; wherein further the coin tones include at least one or two coin tone frequencies, and the system has a bandpass filter having at least one pass band corresponding to the tone frequencies, and a tone detector coupled to the bandpass filter for generating a coin telephone disabling signal in response to receipt of the tone frequencies, wherein the disabling signal is connected to the coin telephone disabling arrangement, so as to prevent dialing of the call.

In accordance with a further feature, the coin telephone fraud prevention system according to the invention, includes a timing arrangement connected to the bandpass filter for timing the duration of the coin tone frequencies and for passing the tone frequencies after lapse of a given delay time to the disabling arrangement, and wherein further the coin telephone fraud prevention system includes a dial assembly for dialling telephone numbers from the coin telephone, a latch in the dial assembly for disabling the dial assembly in its latched condition, a hookswitch in the coin telephone having an on-hook condition wherein the latch has a reset input coupled to the hookswitch for resetting the latch in response to the on-hook condition of the hookswitch.

In accordance with still another feature, the coin fraud prevention system includes a remote fraud signalling arrangement coupled to the coin tone sensing arrangement for remotely signalling presence of the coin tones to a supervised alarm position. This arrangement may include an automatic alarm number dialer coupled to the remote fraud signalling arrangement for automatically dialling a number of the remote alarm location in case of presence of the fraudulent coin tone, and wherein further the coin telephone has a distinct coin telephone number, including a distinct coin telephone number dialling arrangement in the remote fraud signalling arrangement for indicating the distinct coin telephone number at the remote alarm location.

The coin fraud prevention system according to the invention may further include a bandpass filter in the tone sensing arrangement, and a phase-locked loop signal detector in the tone sensing arrangement, coupled to the bandpass filter, for generating the coin tone disabling signal. It may additionally include a Schmitt-trigger coupled to the tone sensing arrangement for setting a signal threshold for the coin tone disabling signal.

The coin fraud prevention system may further include a pulse counter in the timing arrangement coupled to the counter for generating the coin telephone disabling signal upon counting of a given number of pulses.

The coin fraud prevention system may also include a coin totalizer in the coin telephone wherein the totalizer has a dial disable input connected to the telephone disabling arrangement for disabling the coin telephone in response to sensing of coin tones.

Further objects and advantages of this invention will be apparent from the following detailed description of a presently preferred embodiment which is illustrated schematically in the accompanying drawings.

BRIEF DESCRIPTION OF THE FIGURES

FIG. 1, 1A, 1B, are a simplified block diagram of a coin telephone system according to the invention;

FIG. 2, 2A, 2B are a circuit diagram of the dial board of a coin telephone; and

FIG. 3, 3A, 3B, 3C are a circuit diagram of the coin tone detection circuit according to the invention.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1B:
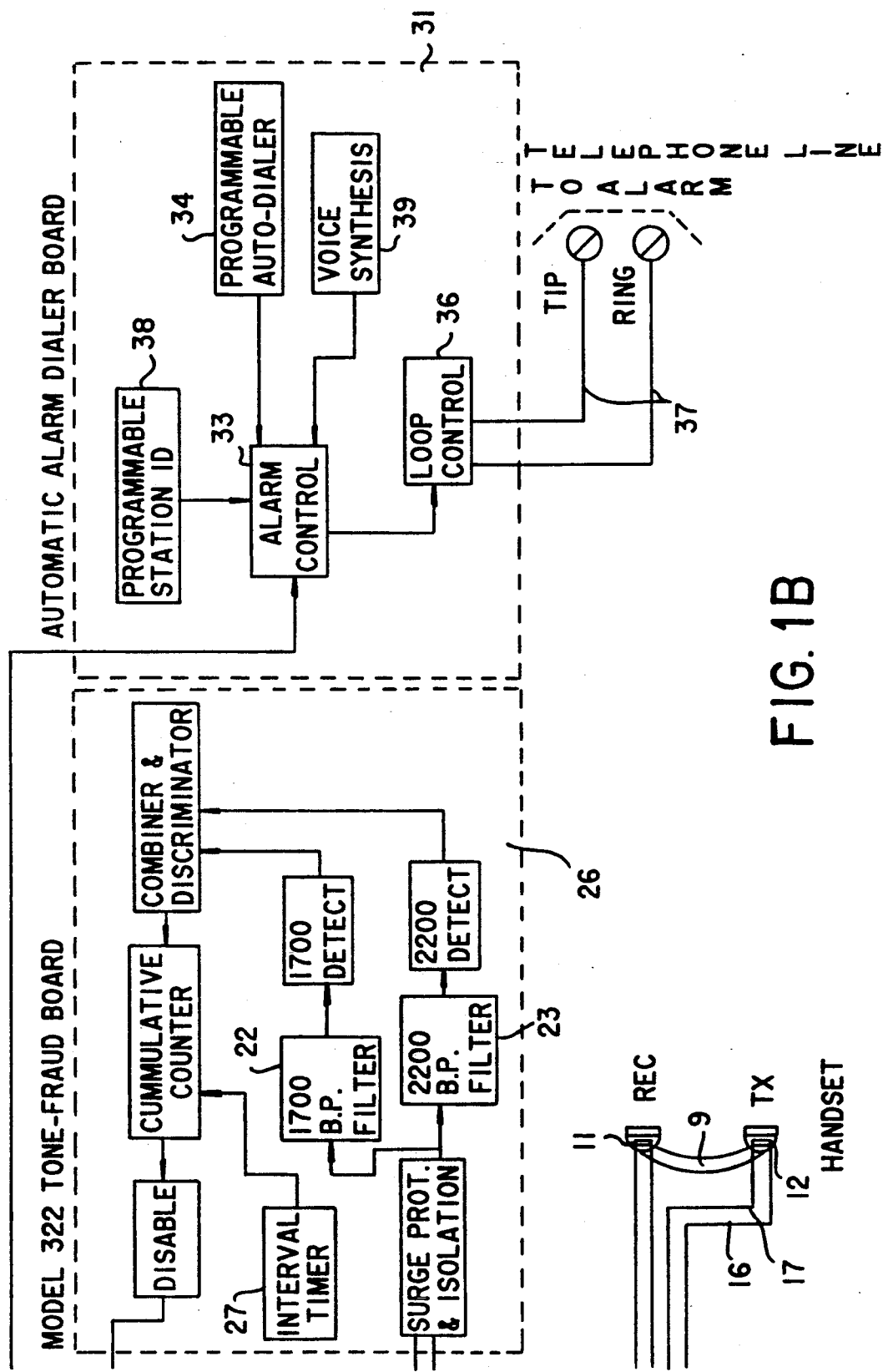

FIG. 1 shows the major parts of a modern coin telephone equipped with certain features including a coin fraud prevention system according to the present invention, and is shown here in order to provide an overview of the construction of such a telephone. A more detailed description of the elements seen in FIG. 1 can be found in U.S. patent application Ser. No. 07/509,859, now U.S. Pat. No. 5,022,073. The parts directly involved in the instant invention, as shown in FIG. 1 are described in the following.

A tip and ring conductor 2, 1 connected to a telephone central exchange, are connected via a hookswitch HS to a dual tone multifrequency (DTMF) key pad circuit 3 via a power supply bridge 8 and a DTMF encoder 7. The DTMF circuit includes a key pad proper 4, with individual dial keys 6, that are connected to the DTMF encoder 7, which in turn supplies the tone signals required for dialling outside numbers. A power supply bridge 8 taps operating power for the key pad circuit 3, including the DTMF encoder 7, from the telephone line 1,2. A handset 9, with a receiver 11 and a transmitter 12 is coupled to the telephone lines 1,2 via a conventional voice network 13 and a totalizer circuit 14, which operates to transmit a combination of coin tones to the central exchange to indicate that coins have been deposited and that dialing of the desired number can be allowed.

In case of coin fraud, coin tones are illicitly generated by an external device and coupled to the telephone transmitter 12 to fraudulently indicate to the central office equipment that a connection can be allowed to be dialed.

Figure 3A:
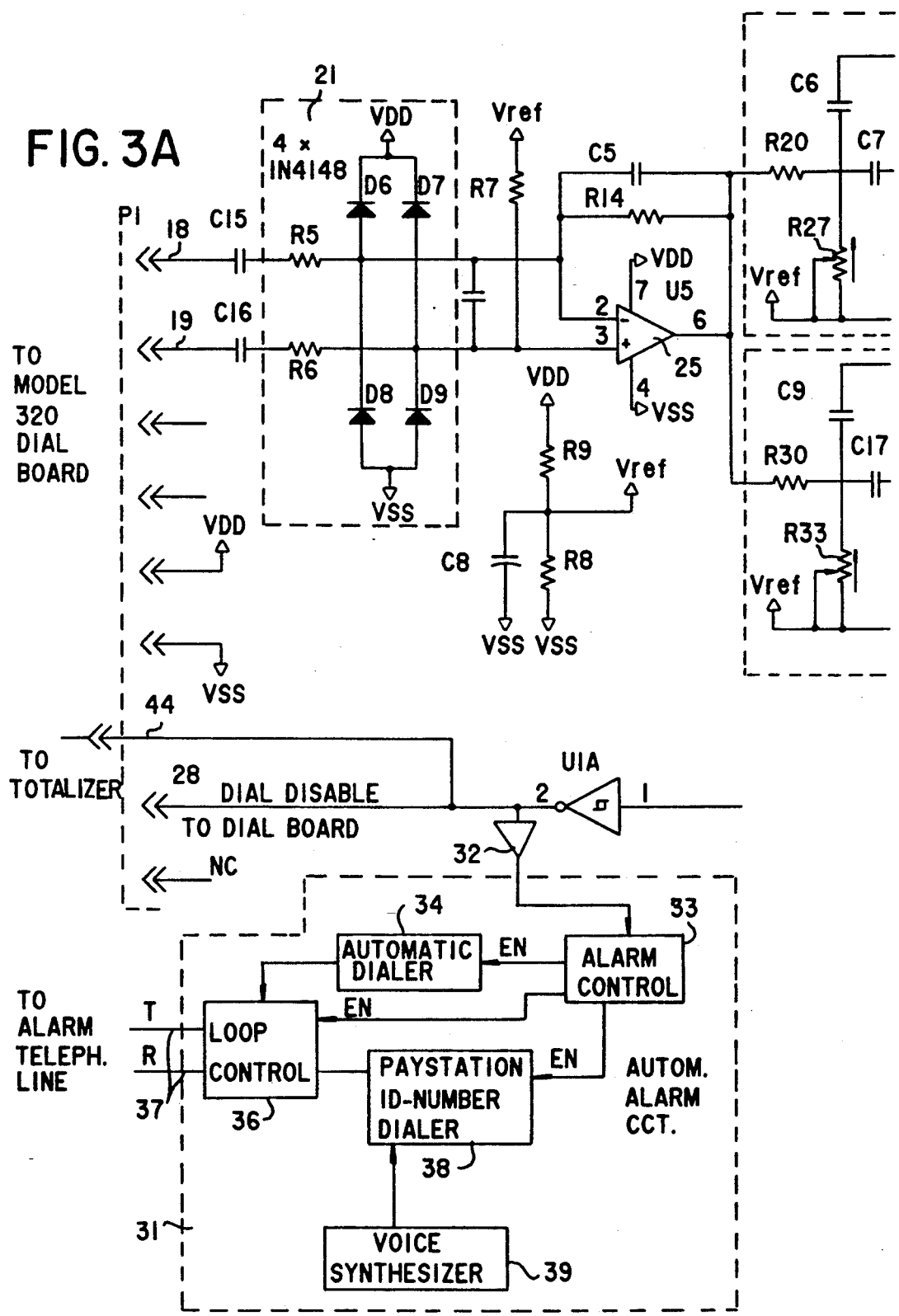
Figure 3B:
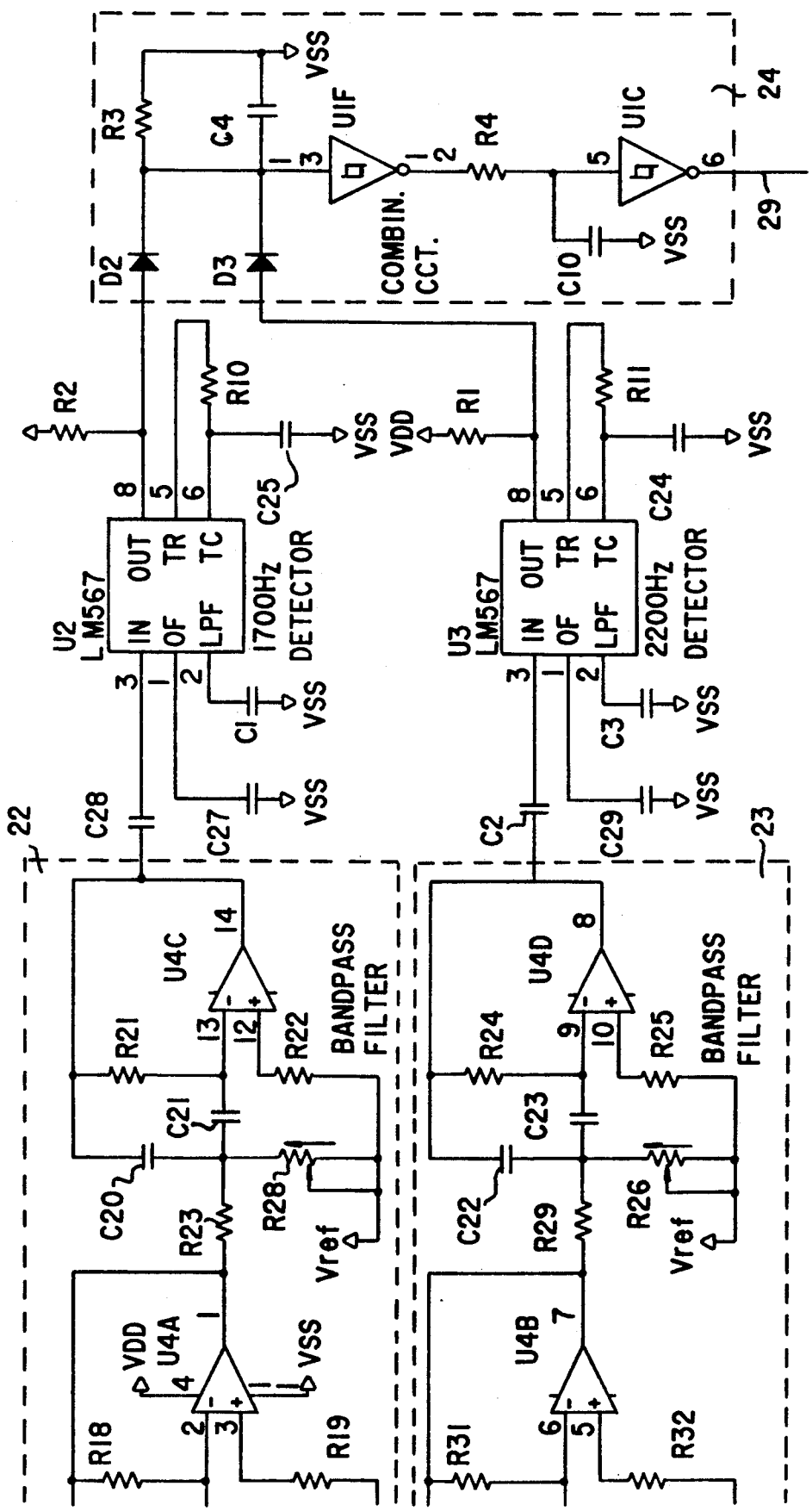

In accordance with the instant invention, an arrangement is provided which connects presence of coin tones at the transmitter leads 16,17, via leads 18,19 to the coin fraud board 26 shown in FIGS. 1 and 3.

In FIG. 3 the coin tone signals are coupled via capacitors C15, C16 in leads 18,19 and a surge protection circuit 21 including four biased antiparallel diodes D6, D7, D8 and D9 which shunt off excessive voltage surges caused for example by pin fraud, and via an isolation amplifier 25 having an output branching into two bandpass filters 22,23 respectively tuned to the proper frequencies of a coin tone. A valid coin tone is a composite of two voice band tones superimposed. The output of each bandpass filter 22,23 is coupled via respective coupling capacitors C28,C2, to respective tone detectors U2,U3 of conventional construction, e.g. in the form of phase-locked loops LM567 commercially available, e.g. from Signetics and other manufacturers.

The outputs of the two tone detectors U2, U3 are combined in a combining circuit 24, which includes two combining diodes D2, D3 coupled to the input of two series-connected hysteresis amplifiers U1F and U1C, which provide a suitable noise-rejecting threshold. The signal is passed on at lead 29 to enable a cumulative self-driven counter U6 at inputs 11 and 10. An interval generator 27 provides an interval pulse every 5-10 seconds, depending upon timing of the central office, from pulsing circuit U1E which, combined with a reset generator U1B, generates a periodic reset which periodically resets the self-driven counter U6 running at a counting frequency determined by capacitor C13 and resistor R13. Whenever the counter U6 is allowed to reach a count on lead 2 (Q13) corresponding to a delay of approximately 100m sec., the thyristor Q1, operating as a latching device, is triggered on and a dial-disable signal is generated on lead 28, via amplifier U1A. The dial disable lead connects to the dial board FIG. 2, lead 28, which operates to disable DTMF encoder U1 via transistor Q3. With the encoder U1 disabled, the perpetrator of the dial fraud is unable to perform any dialling. Upon hang-up the hookswitch HS disconnects the potential at tip and ring leads T.R. (1,2) which restores the latched thyristor Q1 to its off condition, and the coin circuit is again ready to provide service.

In accordance with a further feature of the invention, an automatic alarm circuit may be provided in connection with the coin fraud prevention system, which operates to signal an alarm location of an attempt to perpetrate a coin fraud. The alarm may be signaled via the central office line 1, 2 or may be signaled on a dedicated alarm line 37 of the automatic alarm circuit.

FIG. 3 shows the automatic alarm circuit 31, having an alarm control 33 with an input connected via an isolation amplifier 32 to the dial disable line 28. In case a dial disable signal appears on dial disable lead 28, the disable signal activates the alarm control circuit 33, which first activates the alarm line 37 via the loop control 36 in accordance with the proper protocol required by the alarm line 37. Next an automatic dialer 34 is enabled by the alarm control 33 to automatically dial a selected number for the alarm location, which may be an operator position or any dedicated alarm system. After reaching the alarm location and receiving proper acknowledgement, a paystation ID-number dialer 38 is activated which informs the alarm location of the identity of the paystation identity, including possibly its geographic location, and advantageously a verbal alarm message is generated by a voice synthesizer circuit 39 Where sufficient, a simple alarm arrangement including a bell or a light being turned on at an alarm location may, of course, also be used.

Figure 2B:
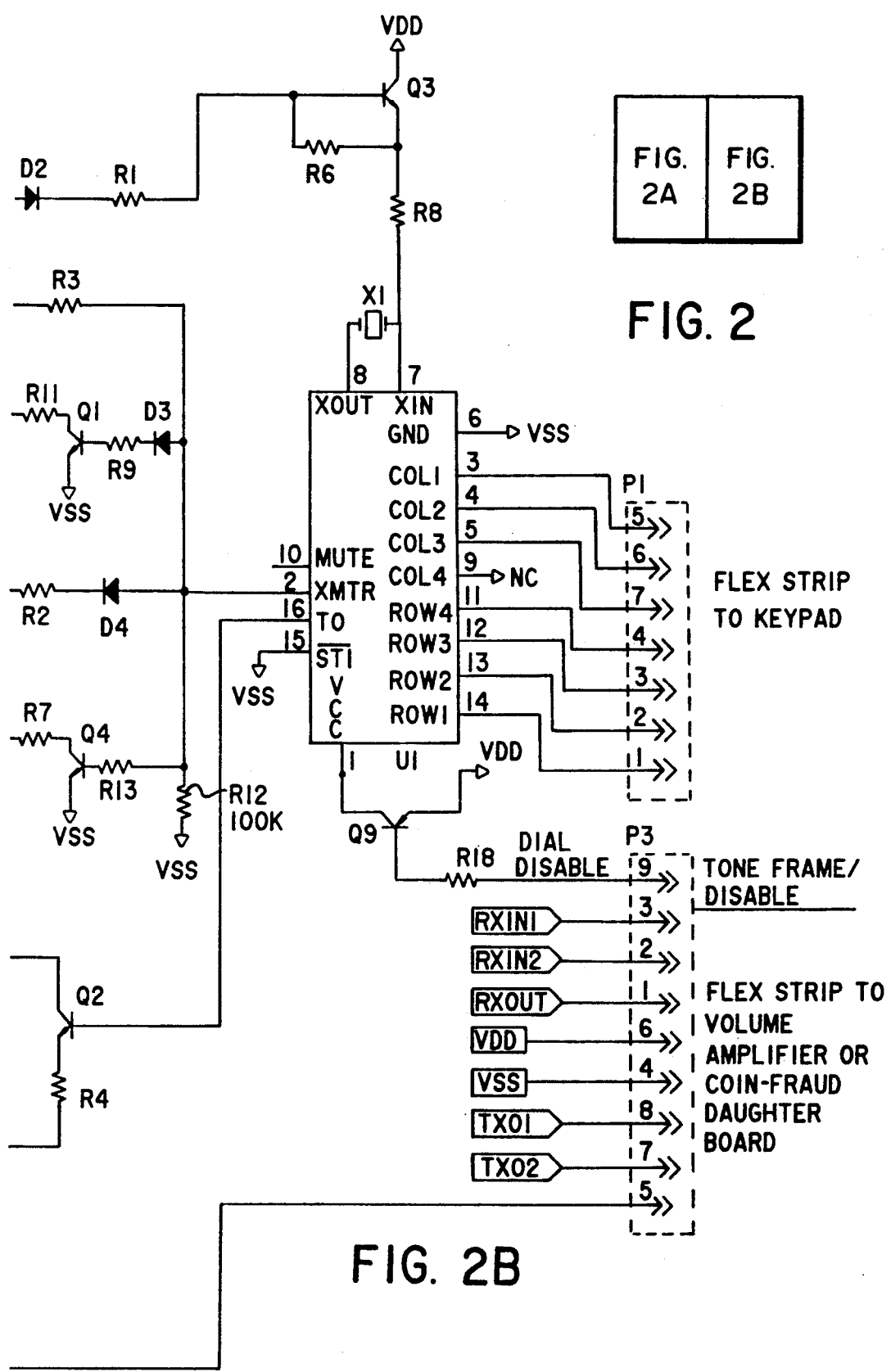
Figure 2A:
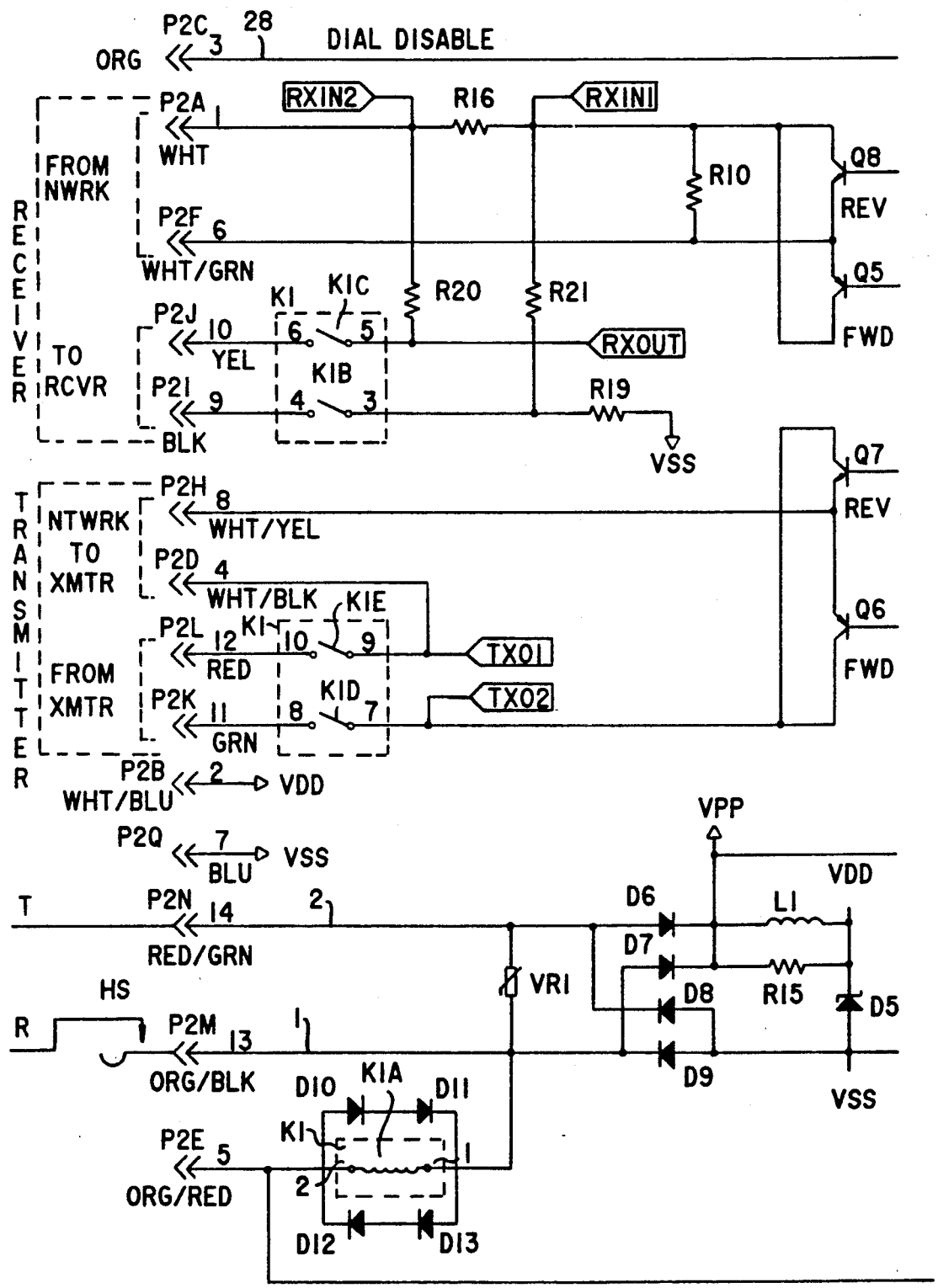

A muting system is also provided, which mutes the transmitter, receiver and outgoing DTMF tones in response to presence of the dial disable signal which is also extended on lead 44 (FIG. 3) to the DTMF sender U1 via transistor Q9 on FIG. 2, which cuts off the connection between U1, pin VCC and reference potential VDD. As a result, transistors Q1, Q4 are turned off resulting in reduced transmitter and receiver levels at the handset and reduced DTMF transmit tones. As a result a low level conversation can be maintained, but no DTMF dialling can be performed.

I claim:

1. A coin fraud prevention system for a coin telephone with a voice transmitter, comprising coin tone detecting means for simultaneously detecting presence of two coin tones coupled to said voice transmitter; and coin telephone disabling means in said coin telephone for disabling said coin telephone in response to detecting coin tones from the transmitter.

2. A coin fraud prevention system for a coin telephone with a voice transmitter, comprising coin tone detecting means for simultaneously detecting presence of two coin tones coupled to said voice transmitter; and coin telephone disabling means in said coin telephone coupled to an output of said coin tone detecting means for disabling said coin telephone in response to detecting coin tones from the transmitter, wherein said coin tones include at least one coin tone frequency; further including a bandpass filter having at least one pass band corresponding to said tone frequency, and a tone detector in said tone detecting means coupled to said bandpass filter for generating a coin telephone disabling signal in response to receipt of said tone frequency, said disabling signal being connected to said coin telephone disabling means.

3. A coin telephone fraud prevention system according to claim 2 including timing means connected to said bandpass filter for timing duration of said tone frequency and for passing said tone frequency after lapse of a given delay time.

4. A coin telephone fraud prevention system according to claim 2, wherein said coin tones include two tone frequencies having respective nominal frequencies as selected for signalling coin deposits.

5. A coin fraud prevention system for a coin telephone with a voice transmitter, comprising coin tone detecting means for simultaneously detecting presence of two coin tones coupled to said voice transmitter; and coin telephone disabling means in said coin telephone coupled to an output of said coin tone detecting means for disabling said coin telephone in response to detecting coin tones from the transmitter in response to detecting coin tones from the transmitter, including a dial assembly for dialling telephone numbers in the coin telephone, a latch in said dial assembly for disabling the dial assembly in its latched condition, a hookswitch in said coin telephone having an on-hook condition, said latch being responsive to said hookswitch for resetting the latch in response to said on-hook condition of the hookswitch.

6. A coin fraud prevention system for a coin telephone with a voice transmitter, comprising coin tone detecting means for simultaneously detecting presence of two coin tones coupled to said voice transmitter; and coin telephone disabling means in said coin telephone coupled to an output of said coin tone detecting means for disabling said coin telephone in response to detecting coin tones from the transmitter, including remote fraud signalling means coupled to said coin tone sensing means for remotely signalling presence of said coin tones.

7. A coin fraud prevention system for a coin telephone with a voice transmitter, comprising coin tone detecting means for simultaneously detecting presence of two coin tones coupled to said voice transmitter; and coin telephone disabling means in said coin telephone coupled to an output of said coin tone detecting means for disabling said coin telephone in response to detecting coin tones from the transmitter, including an automatic alarm number dialer coupled to said remote fraud signalling means for automatically dialling a number of a remote alarm location in case of presence of said coin tone.

8. A coin fraud prevention system according to claim 7, wherein said coin telephone has a distinct coin telephone number, including distinct coin telephone number dialling means in said remote fraud signalling means for indicating said distinct coin telephone number at said remote alarm location.

9. A coin fraud prevention system according to claim 2, including a four-pole active bandpass filter in said tone sensing means.

10. A coin fraud prevention system according to claim 9, including a signal detector in said tone sensing means, coupled to said four-pole active bandpass filter, for generating said coin tone disabling signal.

11. A coin fraud prevention system according to claim 10 including a Schmitt-trigger coupled to said tone sensing means for setting a signal threshold for said coin tone disabling signal.

12. A coin fraud prevention system according to claim 3, including a pulse generator and a pulse counter in said timing means coupled to said counter, for generating said coin telephone disabling signal upon counting of a given number of pulses.

13. A coin fraud prevention system for a coin telephone with a voice transmitter, comprising coin tone detecting means for simultaneously detecting presence of two coin tones coupled to said voice transmitter; and coin telephone disabling means in said coin telephone coupled to an output of said coin tone detecting means for disabling said coin telephone in response to detecting coin tones from the transmitter, including a coin totalizer in said coin telephone, said totalizer having a dial disable input connected to said telephone disabling means for disabling said coin totalizer in response to sensing of the coin tones coupled to said transmitter.

14. A coin fraud prevention system for a coin telephone with a voice transmitter, comprising coin tone detecting means for simultaneously detecting presence of two coin tones coupled to said voice transmitter and coin telephone disabling means in said coin telephone coupled to an output of said coin tone detecting means for disabling said coin telephone in response to detecting coin tones from the transmitter including muting means for muting said coin telephone in response to said coin telephone disabling means.

* * * * *